United States Patent
Nakano et al.

(10) Patent No.: US 11,379,134 B2
(45) Date of Patent: Jul. 5, 2022

(54) CONTROL APPARATUS, VEHICLE, CONTROL METHOD, AND NON-TRANSITORY COMPUTER READABLE MEDIUM

(71) Applicant: TOYOTA JIDOSHA KABUSHIKI KAISHA, Toyota (JP)

(72) Inventors: Keiko Nakano, Kawasaki (JP); Yu Nagata, Nagoya (JP); Takashi Hayashi, Aichi-gun (JP); Ryota Kondo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 16/899,863

(22) Filed: Jun. 12, 2020

(65) Prior Publication Data
US 2021/0026550 A1    Jan. 28, 2021

(30) Foreign Application Priority Data
Jul. 24, 2019  (JP) .............................. JP2019-136436

(51) Int. Cl.
*G06F 3/06* (2006.01)
*B60W 50/14* (2020.01)
*B60W 60/00* (2020.01)
*G05D 1/00* (2006.01)

(52) U.S. Cl.
CPC .......... *G06F 3/0637* (2013.01); *G06F 3/0622* (2013.01); *G06F 3/0659* (2013.01); *G06F 3/0673* (2013.01); *B60W 50/14* (2013.01); *B60W 60/001* (2020.02); *B60W 2050/146* (2013.01); *B60W 2555/60* (2020.02); *G05D 1/0088* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2009/0164838 A1* | 6/2009 | Haller | G06F 11/1666 714/E11.159 |
| 2017/0357450 A1* | 12/2017 | Barbou-Des-Places | G06F 9/44 |
| 2020/0226273 A1* | 7/2020 | Kariu | G06F 3/0622 |

FOREIGN PATENT DOCUMENTS

JP    2016-215751 A    12/2016

* cited by examiner

*Primary Examiner* — Charles J Choi
(74) *Attorney, Agent, or Firm* — Oliff PLC

(57) ABSTRACT

A control apparatus for a vehicle includes a memory and a controller. The memory has a first storage area, which is a write restricted area storing one or more first control patterns out of a plurality of control patterns for the vehicle, and a second storage area, which is a write enabled area storing one or more second control patterns out of the plurality of control patterns for the vehicle. The controller determines whether a control condition for each of the plurality of control patterns is satisfied based on a state of the vehicle, to select one or more control patterns for each of which the control condition is satisfied, and to control the vehicle according to the selected one or more control patterns.

17 Claims, 5 Drawing Sheets

| Control pattern ID | Control condition | Control content | Information indicating whether control pattern is priority control pattern |
|---|---|---|---|
| 1 | Vehicle running on ordinary road | Run vehicle at 60km/h or less | Yes |
| 2 | Vehicle running on highway | Run vehicle at 50km/h or more | Yes |
| 3 | Passenger not wearing seat belt during running | Output warning message A from speakers inside vehicle | No |
| 4 | Illuminance level outside vehicle being lights-on illuminance level | Turn on interior lights | No |

*FIG. 2*

| Control pattern ID | Control condition | Control content |
|---|---|---|
| 5 | Sea viewable from window | Run vehicle at 30km/h or less |
| 6 | Sea viewable from window | Open window of vehicle |
| 7 | Passenger not wearing seat belt during running | Output warning message B from speakers inside vehicle |
| 8 | Video displayed on display in vehicle | Turn off interior lights. |

*FIG. 3*

| Time | States of vehicle | | | | | | Selected control pattern(s) |
|---|---|---|---|---|---|---|---|
| | Running state information | | In-vehicle state information | | Out-of-vehicle state information | | |
| | Speed (km/h) | Classification of roadway on which vehicle is running | Passenger not wearing seat belt | Image displayed on display | Sea viewable | Illuminance level | |
| TimeA | 30 | Ordinary road | Not present | Displayed | Not viewable | Lights-off illuminance level | 1, 8 |
| TimeB | 70 | Highway | Not present | Not displayed | Viewable | Lights-off illuminance level | 2, 5, 6 |
| TimeC | 50 | Ordinary road | Not present | Not displayed | Viewable | Lights-off illuminance level | 1, 5, 6 |
| TimeD | 30 | Ordinary road | Present | Not displayed | Not viewable | Lights-off illuminance level | 1, 3, 7 |
| TimeE | 30 | Ordinary road | Not present | Displayed | Not viewable | Lights-on illuminance level | 1, 4, 8 |
| ... | ... | ... | ... | ... | ... | ... | ... |

FIG. 4

CONTROL APPARATUS, VEHICLE, CONTROL METHOD, AND NON-TRANSITORY COMPUTER READABLE MEDIUM

CROSS-REFERENCE TO RELATED APPLICATIONS

This application claims priority to and the benefit of Japanese Patent Application No. 2019-136436, filed on Jul. 24, 2019, the entire contents of which are incorporated herein by reference.

TECHNICAL FIELD

The present disclosure relates to a control apparatus, a vehicle, a control method, and a control program.

BACKGROUND

Technologies for controlling vehicles are known. For example, Patent Literature (PTL) 1 discloses an automated running control system that notifies a person inside or outside a vehicle if a predetermined prohibited action is taken in the vehicle.

CITATION LIST

Patent Literature

PTL 1: JP 2016-215751 A

SUMMARY

Conventional technologies for controlling vehicles have room for further improvement in terms of convenience, in order to accommodate the diversification in the use and usage modes of such vehicles. For example, it is desired to enable not only a manufacturer which manufactures and sells vehicles, but also a user who uses the vehicles, to set unique control conditions, on the basis of which the vehicles are to be controlled.

It would therefore be helpful to provide a control apparatus, a vehicle, a control method, and a control program which improve the convenience of technologies for controlling the vehicle.

A control apparatus according to an embodiment of the present disclosure is a control apparatus for a vehicle, including:

a memory having a first storage area, which is a write restricted area configured to store one or more first control patterns out of a plurality of control patterns for the vehicle, and a second storage area, which is a write enabled area configured to store one or more second control patterns out of the plurality of control patterns for the vehicle; and a controller configured to determine whether a control condition for each of the plurality of control patterns is satisfied based on a state of the vehicle, to select one or more control patterns for each of which the control condition is satisfied, and to control the vehicle according to the selected one or more control patterns.

A control method according to an embodiment of the present disclosure is a control method for a vehicle, the vehicle including a controller and a memory having a first storage area, which is a write restricted area storing one or more first control patterns out of a plurality of control patterns for the vehicle, and a second storage area, which is a write enabled area storing one or more second control patterns out of the plurality of control patterns for the vehicle, the control method including:

determining, by the controller, whether a control condition for each of the plurality of control patterns is satisfied based on a state of the vehicle, to select one or more control patterns for each of which the control condition is satisfied; and controlling, by the controller, the vehicle according to the selected one or more control patterns.

The control program according to an embodiment of the present disclosure causes a computer including a memory having a first storage area, which is a write restricted area storing one or more first control patterns out of a plurality of control patterns for the vehicle, and a second storage area, which is a write enabled area storing one or more second control patterns out of the plurality of control patterns for the vehicle, to execute:

determining whether a control condition for each of the plurality of control patterns is satisfied based on a state of the vehicle, to select one or more control patterns for each of which the control condition is satisfied; and controlling the vehicle according to the selected one or more control patterns.

A control apparatus, a vehicle, a control method, and a control program according to an embodiment of the present disclosure improve the convenience of technologies for controlling the vehicle.

BRIEF DESCRIPTION OF THE DRAWINGS

In the accompanying drawings:

FIG. 2 illustrates an example of first control patterns stored in a first storage area;

FIG. 3 illustrates an example of second control patterns stored in a second storage area;

FIG. 4 illustrates an example of states of the vehicle stored in a memory.

DETAILED DESCRIPTION

Figure 1:
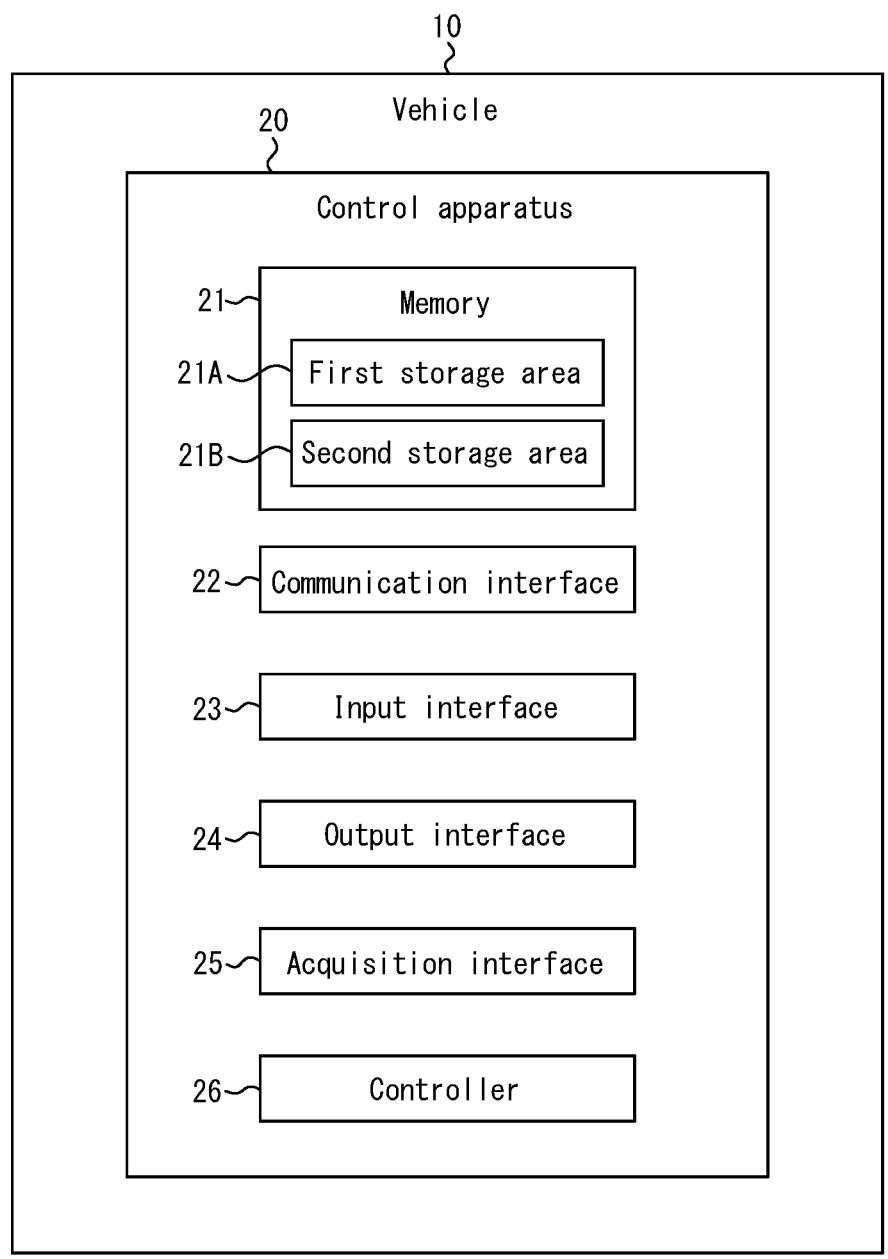
FIG. 1 is a block diagram illustrating a schematic configuration of a vehicle according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are appropriately omitted or simplified.

Referring to FIG. 1, an outline of the present embodiment will be described.

A vehicle 10 is a vehicle in which at least some of the functions of the vehicle 10 are automatically controlled. The vehicle 10 may be, for example, a vehicle such as an on-demand bus, a rental car, a shared car, or a taxi. In the present embodiment, the vehicle 10 may be driven by a driver or automated for driving according to an automation level. The automation level is, for example, one of levels 1 to 5 according to the level classification provided by the Society of Automotive Engineers (SAE).

The vehicle 10 is controlled according to one or more control patterns for the vehicle 10, which will be described in detail later. The vehicle 10 includes a first storage area 21A, which is a write restricted area, and a second storage area 21B, which is a write enabled area, as areas for storing the control patterns. For example, one or more control patterns are pre-registered in the first storage area 21A by a manufacturer or the like of the vehicle 10 before shipment of the vehicle 10, and one or more control patterns are registered in the second storage area 21B by a user of the vehicle 10 after shipment of the vehicle 10.

The user of the vehicle 10 can register control patterns according to the use of the vehicle 10. For example, in a case in which the user provides a food and drink service to a passenger inside the vehicle 10, the user of the vehicle 10 can register a control pattern related to the food and drink service. Alternatively, in a case in which the user provides a movie screening service inside the vehicle 10, the user of the vehicle 10 can register a control pattern related to the movie screening service.

According to this configuration, the vehicle 10 can reduce the risk of the pre-registered control patterns being rewritten, while allowing registration, modification, deletion, and the like of control patterns used to control the vehicle 10, for the user of the vehicle 10. Thus, the convenience of technologies for controlling the vehicle 10 is improved.

Referring to FIG. 1, the configuration of the vehicle 10 according to the present embodiment will be described.

The vehicle 10 includes a control apparatus 20.

The control apparatus 20 is an apparatus for controlling at least some of the mechanisms included in the vehicle 10. The control apparatus 20 is communicably connected to other vehicle-mounted devices mounted to the vehicle 10 via a vehicle-mounted network such as a Controller Area Network (CAN), or dedicated lines, to thereby enable control of the other vehicle-mounted devices. The control apparatus 20 may be embedded in the vehicle 10, or may be detachably provided to the vehicle 10. In the present embodiment, the control apparatus 20 is, for example, an Electronic Control Unit (ECU) mounted to the vehicle 10. However, the control apparatus 20 is not limited to the ECU. The control apparatus 20 may be any vehicle-mounted device such as a car navigation device. The control apparatus 20 may be an electronic device such as a mobile phone, a smart phone, or a tablet that is used while being connected to a vehicle-mounted device via a wired or wireless connection.

The control apparatus 20 includes a memory 21, a communication interface 22, an input interface 23, an output interface 24, an acquisition interface 25, and a controller 26. The memory 21, the communication interface 22, the input interface 23, the output interface 24, the acquisition interface 25, and the controller 26 are communicably connected to each other.

The memory 21 may be, for example, a semi-conductor memory, a magnetic memory, an optical memory, or the like. The memory 21 may function as, for example, a main memory, an auxiliary memory, or a cache memory. The memory 21 stores any information used for operation of the control apparatus 20. For example, the memory 21 may store a system program, an application program, embedded software, and the like.

The memory 21 has at least a first storage area 21A and a second storage area 21B. In the present embodiment, the first storage area 21A and the second storage area 21B are areas which are physically different from each other, each area being allocated to different memories. However, the first storage area 21A and the second storage area 21B may be allocated to the same memory, and may be areas managed under the control of the controller 26 as areas which are virtually different from each other, for example.

The first storage area 21A is a write restricted area to which writing is restricted. The second storage area 21B is a write enabled area to which writing is permitted. In the present embodiment, "writing" to the memory 21 includes registration, modification, and deletion of information in the memory 21. Therefore, the write restricted area is an area to which further registration, modification, and deletion of information are restricted once the information has been registered. In the first storage area 21A, write restriction may be achieved by physical means such as switching or by virtual means such as control by the controller 26. On the other hand, in the write enabled area, further registration, modification, and deletion of information can be performed after the information is first registered.

The memory 21 stores a plurality of control patterns for the vehicle 10. In the present embodiment, the control patterns for the vehicle 10 are information used to control at least some of the functions of the vehicle 10. The functions of the vehicle 10 may be realized by the mechanisms included in the vehicle 10, or by one or more vehicle-mounted devices mounted to the vehicle 10. A control pattern may consist of, for example, at least one of an instruction set, parameters, setup files, programs, data, and the like. The control pattern is stored in association with a control condition and control content. In the present embodiment, the control condition stored in association with the control pattern is also referred to as a control condition for the control pattern, and the control content stored in association with the control pattern is also referred to as control content for the control pattern. The control condition is a condition under which control of the vehicle 10 according to the control pattern is executed. The control condition may include, for example, a condition for starting, ending, or pausing control according to the control pattern, a condition for an execution mode of the control such as a starting time, an ending time, a duration, or the number of repetitions, or the like. The control content specifies the control to be executed according to the control pattern. The control content includes, for example, acceleration, deceleration, steering, and the like of the vehicle 10. The control content may include turning on and off directional indicators, headlights, or fog lamps. In addition, the control content may include setting a running path, displaying an image, outputting sound, playing music, turning on and off interior lights, changing seat positions, opening and closing doors or windows, setting temperature of an air conditioner, and the like. In the present embodiment, the control patterns stored in the first storage area 21A are also referred to as first control patterns, and the control patterns stored in the second storage area 21B are also referred to as second control patterns.

Referring to FIGS. 2 and 3, an example of the first control patterns and of the second control patterns, each to be stored in the first storage area 21A and the second storage area 21B of the memory 21 respectively, will be described. The first storage area 21A and the second storage area 21B may store, for example, control-pattern identification information which uniquely identifies the individual control patterns. The control-pattern identification information is also referred to as control pattern identifiers (IDs). The first storage area 21A and the second storage area 21B may store the control conditions and the control content in association with the respective control pattern IDs. Each of the control patterns of the control pattern IDs 1 to 8 illustrated in FIGS. 2 and 3 is simply referred to as control pattern 1 to 8, respectively, for the sake of simplicity.

At least one first control pattern may be a priority control pattern. Priority control patterns are executed with a higher priority than other control patterns. The priority control patterns include, for example, a control pattern for running the vehicle 10 according to a traffic rule. Running of the vehicle 10 in accordance with the traffic rule includes running the vehicle 10 in accordance with laws and ordinances such as the Japanese Road Traffic Law and the Order for Enforcement of the Japanese Road Traffic Law, road signs, generally known driving manners, and the like. A priority control pattern is, for example, a control pattern to, "when the vehicle 10 is running on a road, run the vehicle 10 at or below a legal maximum speed of the road". Alternatively, a priority control pattern may be a control pattern to, "when the vehicle 10 is running on a road, run the vehicle 10 at or above a legal minimum speed of the road". A priority control pattern may be a control pattern to "run the vehicle 10 when it is confirmed that the passenger is wearing a seat belt". A priority control pattern may be a control pattern to "when a road sign is installed on a roadway on which the vehicle 10 is running, run the vehicle 10 in accordance with the road sign". For example, as illustrated in FIG. 2, the first storage area 21A may store information indicating whether each control pattern is a priority control pattern in association with a corresponding control pattern ID. The controller 26 may determine whether each first control pattern is a priority control pattern, based on the information indicating whether each control pattern is a priority control pattern. The first control patterns which are not priority control patterns are also referred to as non-priority control patterns.

The memory 21 further stores the state of the vehicle 10. Referring to FIG. 4, an example of the state of the vehicle 10 to be stored in the memory 21 will be described below. The state of the vehicle 10 may include, for example, a running state, an in-vehicle state, and an out-of-vehicle state.

The running state of the vehicle 10 is information used to determine the state in which the vehicle 10 is running or stopped. The running state of the vehicle 10 may include, for example, two-dimensional coordinates, three-dimensional coordinates, speed, running direction, type of running road, running path, running distance, and the like of the vehicle 10. As illustrated in FIG. 4, in the present embodiment, the state of the vehicle 10 will be described assuming that the running state includes the speed of the vehicle 10 and the type of roadway on which the vehicle 10 is running.

The in-vehicle state of the vehicle 10 is information used to determine the conditions in the interior of the vehicle 10. The in-vehicle state of the vehicle 10 may include, for example, the number of passengers, the riding position, the posture, whether a passenger not wearing a seat belt is present, the position of the interior facilities, turning on or off of lights, unlocking/locking of doors, opening and closing of windows, and the like. As illustrated in FIG. 4, in the present embodiment, the state of the vehicle 10 will be described assuming that the in-vehicle state includes whether a passenger not wearing a seat belt is present, and whether an image is displayed on a display.

The out-of-vehicle state 10 is information used to determine the conditions in the surroundings of the vehicle 10. The out-of-vehicle state 10 may include, for example, weather, temperature, humidity, scenery, whether an obstacle is present, and the like in the surroundings of the vehicle 10. As illustrated in FIG. 4, in the present embodiment, the state of the vehicle 10 will be described assuming that the out-of-vehicle state includes whether a sea is viewable from a window of the vehicle 10, and the illuminance level outside the vehicle 10.

The communication interface 22 includes one or more communication modules. The communication modules include, for example, a communication module conforming to a telecommunication standard of a vehicle-mounted network, such as the CAN described above. The communication modules may include a communication module conforming to a mobile communication standard, such as 4th Generation (4G) and 5th Generation (5G). For example, a vehicle-mounted communicator may function as the communication interface 22. In the present embodiment, the communication interface 22 transmits and receives information to and from other vehicle-mounted devices connected via vehicle-mounted networks, information processing apparatus external to the vehicle 10 and connected according to a mobile communication standard, or the like.

The input interface 23 accepts input operations. The input interface 23 may be, for example, any input device such as a touch panel, a camera, a microphone, or an IC card reader. Upon accepting an input operation, the input interface 23 converts the input operation into electrical information.

The output interface 24 outputs information in the form of images, sound, or the like. The output interface 24 may be any output device such as a display or a speaker, for example.

The acquisition interface 25 acquires information indicating the state of the vehicle 10. Though the details will be described later, in the present embodiment, the information indicating the state of the vehicle 10 is used by the controller 26 to determine the state of the vehicle 10.

The acquisition interface 25 may include, for example, a positioning mechanism for acquiring positional information for the vehicle 10. The acquisition interface 25 may include a receiver corresponding to a satellite positioning system as the positioning mechanism. The satellite positioning system to which the receiver corresponds may be, for example, the Global Positioning System (GPS). For example, a car navigation device may function as the acquisition interface 25.

The acquisition interface 25 may include a photographing mechanism to take images inside or outside of the vehicle 10. The acquisition interface 25 may include a camera as the photographing mechanism. For example, a vehicle-mounted camera such as a dashboard camera may function as the acquisition interface 25.

The acquisition interface 25 may include a measuring mechanism to measure a physical quantity inside or outside of the vehicle 10. The acquisition interface 25 may include a speedometer, an acceleration sensor, a gyrosensor, a human sensor, a illuminance sensor, an opening/closing sensor for a door, a thermometer, a hygrometer, a raindrop sensor, a radar, and the like, as the measurement mechanism.

The controller 26 includes one or more processors. The controller 26 may control the above described memory 21, communication interface 22, input interface 23, output interface 24, and acquisition interface 25 in order to realize each of their respective functions. In the present embodiment, the "processor" may be a general purpose processor, a purpose-specific processor specialized for a specific process, or the like.

Figure 5:
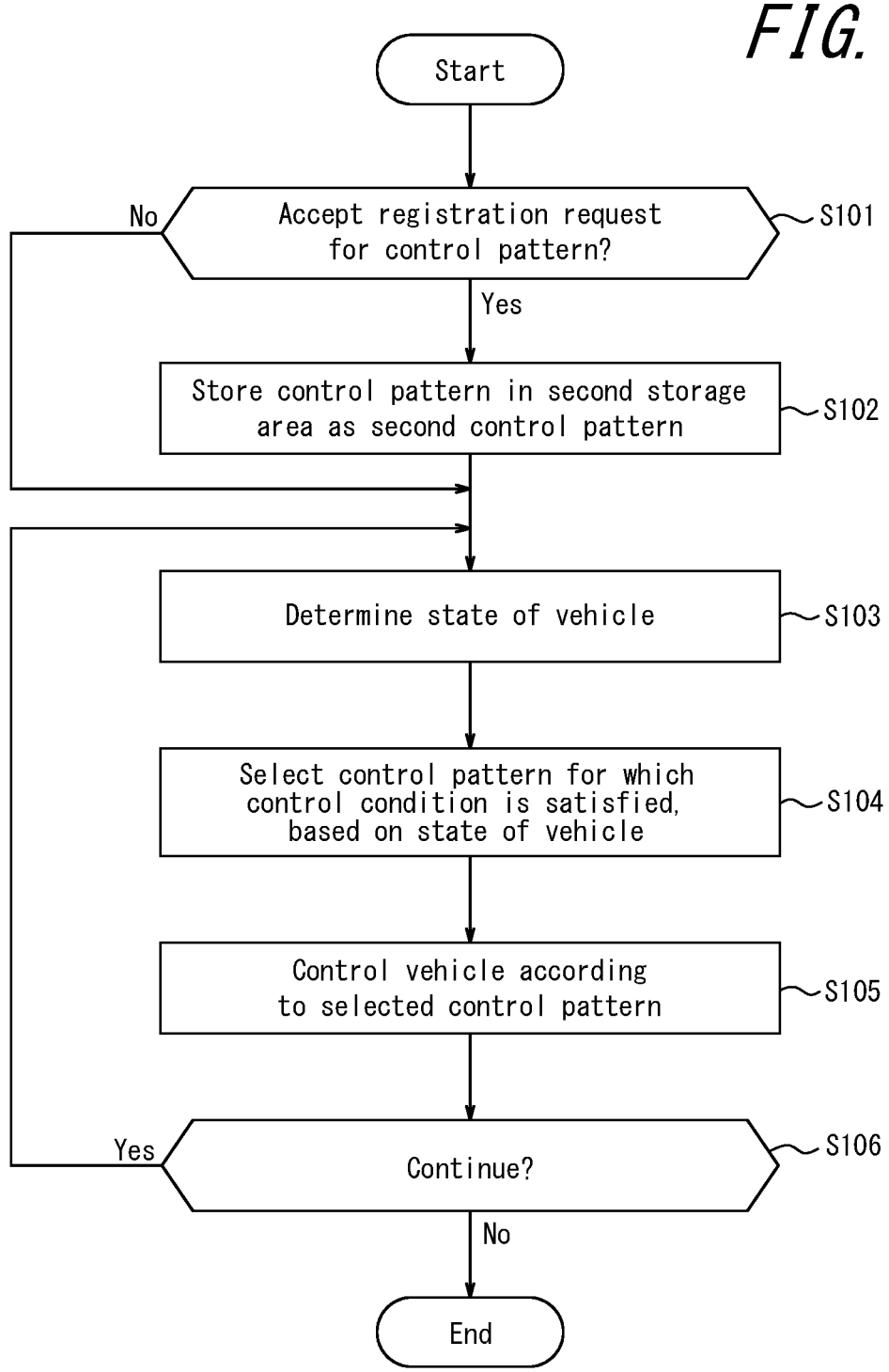
FIG. 5 is a flow chart illustrating operation of a control apparatus included in an information processing system.

Referring to FIG. 5, operation of the control apparatus 20, which is realized by controlling the functions of the control apparatus 20 by the controller 26, will be described. The operation of the control apparatus 20 correspond to a control method of the control apparatus 20 and of the vehicle 10 including the control apparatus 20. The description is provided on the assumption that, in the present process, the first control patterns are pre-stored in the first storage area 21A and the second control patterns are pre-stored in the second storage area 21B.

In step S101, the controller 26 accepts a registration request of a control pattern.

Specifically, the controller 26 can accept the registration request of the control pattern via the communication interface 22. Alternatively, the controller 26 may accept the registration request of the control pattern via the input interface 23. The registration request of the control pattern includes at least one control pattern or information for designating the at least one control pattern. In the present embodiment, the control pattern designated by the registration request of the control pattern is also referred to as a "new control pattern". If the controller 26 does not accept a registration request of the control pattern (step S101—No), the controller 26 may execute the process of step S103 without executing the process of step S102.

In step S102, the controller 26 causes the second storage area 21B to store the control pattern as a second control pattern.

Specifically, the controller 26 causes the second storage area 21B, which is the write enabled area of the memory 21, to store the control pattern designated by the accepted registration request. The controller 26 may cause the second storage area 21B to store the control pattern in association with a control pattern ID.

In step S103, the controller 26 determines the state of the vehicle 10 based on information acquired by the acquisition interface 25.

Specifically, the controller 26 determines the state of the vehicle 10 based on information indicating the state of the vehicle 10 acquired by the acquisition interface 25. For example, as illustrated in FIG. 4, the controller 26 may determine the speed of the vehicle 10 from information measured by the speedometer. The controller 26 may identify the roadway on which the vehicle 10 is running from positional information acquired by a GPS receiver, and determine whether the roadway is classified as an ordinary road or a highway. The controller 26 may determine whether a passenger not wearing a seat belt is present, from an image captured by an in-vehicle camera. The controller 26 may determine whether an image is displayed on a display in the vehicle 10, from information acquired from the illuminance sensor. The controller 26 may determine whether a sea is viewable from a window, from images captured by an out-of-vehicle camera. The controller 26 may determine whether the illuminance level outside the vehicle 10 is a lights-on illuminance level or lights-off illuminance level, from the information acquired by the illuminance sensor. The controller 26 may cause the memory 21 to store the determination result as the state of the vehicle 10.

In step S104, the controller 26 determines whether the control condition for each of the plurality of control patterns is satisfied based on the state of the vehicle 10, and selects one or more control patterns for each of which the control condition is satisfied.

Specifically, the controller 26 compares the state of the vehicle 10 stored in the memory 21 with each of the control conditions of the first control patterns and the control conditions of the second control patterns, to select control patterns for which the control conditions are satisfied. For example, referring to FIGS. 2, 3, and 4, the controller 26 determines that the control condition "the vehicle running on an ordinary road" of control pattern 1 in FIG. 2 is satisfied, since the type of roadway on which the vehicle 10 is running is classified as an ordinary road at time A in FIG. 4. The controller 26 determines that the control condition "the vehicle running on a highway" of control pattern 2 in FIG. 2 is not satisfied, at time A in FIG. 4. In this manner, the controller 26 selects one or more control patterns for each of which the control condition is satisfied, from the first control patterns and the second control patterns. The controller 26 may cause the memory 21 to store the selected control patterns. The controller 26 may select two or more control patterns for each of which the control condition is satisfied, from the first control patterns and the second control patterns, and cause the memory 21 to store the selected control patterns.

In step S105, the controller 26 controls the vehicle 10 according to the selected one or more control patterns.

Specifically, the controller 26 controls the vehicle 10 according to the selected control patterns. In the present embodiment, the controller 26 realizes control of the vehicle 10 as specified in the control content of the control patterns by controlling the vehicle 10 according to the control patterns. For example, at time A in FIG. 4, if control patterns 1 and 8 are selected, the controller 26 controls the vehicle 10 according to each of the control patterns. Referring to FIG. 2, in order to realize the control content "run at 60 km/h or less" of the control pattern 1, the controller 26 controls acceleration or braking of the vehicle 10 to run the vehicle 10 at 60 km/h or less. Similarly, referring to FIG. 3, in order to realize the control content "turn off the interior lights" of control pattern 8, the controller 26 controls the interior lights of the vehicle 10 such that they are turned off.

In step S105, when two or more control patterns are selected, the controller 26 may determine whether the selected two or more control patterns include control patterns which conflict with each other.

Specifically, the controller 26 may determine whether two control patterns X and Y conflict with each other, depending on whether there is a case in which the control content of two control patterns X and Y cannot be executed simultaneously. The controller 26 may determine that two control patterns X and Y conflict with each other, for example, if at least some of the mechanisms of the vehicle 10 and the vehicle-mounted devices to be controlled by control pattern X, and at least some of the mechanisms of the vehicle 10 and the vehicle-mounted devices to be controlled by control pattern Y are the same. Alternatively, the controller 26 may determine that two control patterns X and Y conflict with each other, if at least some of the parameters included in control pattern X and at least some of the parameters included in control pattern Y are the same.

The controller 26 controls the vehicle 10 according to the selected two or more control patterns if the selected two or more control patterns do not include control patterns which conflict with each other.

Conversely, if the selected two or more control patterns include control patterns which conflict with each other, the controller 26 further determines whether the conflicting control patterns include a priority control pattern.

The controller 26 may prioritize control according to the priority control pattern when the two or more selected control patterns include control patterns which conflict with each other, and at least one of the conflicting control patterns is the priority control pattern. That is, the controller 26 may prioritize control according to the priority control pattern when the selected two or more control patterns include the priority control pattern and a control pattern which conflicts with the priority control pattern.

For example, control patterns 2, 5, and 6 are assumed to be selected at time B in FIG. 4. The controller 26 determines whether control patterns 2, 5, and 6 conflict with each other. As illustrated in FIGS. 2 and 3, the objects of control according to the control content "run the vehicle at 50 km/h or more" of control pattern 2 and the control content "run the vehicle at 30 km/h or less" of control pattern 5 are the accelerator or the brakes of the vehicle 10, and a vehicle speed is included in the respective parameters. Therefore, the controller 26 determines that control patterns 2 and 5 conflict with each other. The controller 26 further determines whether either of control patterns 2 and 5 conflicting with each other is a priority control pattern. As illustrated in FIG. 2, if control pattern 2 is a priority control pattern, the controller 26 executes control according to control pattern 2, which is a priority control pattern, and does not execute control according to control pattern 5. As a result, a control pattern, even if set by the user, is not executed if the control pattern conflicts with a priority control pattern pre-stored in the first storage area 21A. Thus, the driving safety of the vehicle 10 is pre-secured by the priority control pattern, thereby enabling the user to freely register control patterns according to the use of the vehicle 10, without being conscious as to the driving safety of the vehicle 10.

Conversely, the controller 26 may prioritize control according to a second control pattern when the selected two or more control patterns include control patterns which conflict with each other, and the conflicting control patterns do not include a priority control pattern. That is, the controller 26 may prioritize control according to a second control pattern which conflicts with a non-priority control pattern which is a first control pattern other than the priority control pattern when the selected two or more control patterns include the non-priority control pattern and the second control pattern which conflicts with the non-priority control pattern.

For example, control patterns 1, 3, and 7 are assumed to be selected at time D in FIG. 4. The controller 26 determines whether control patterns 1, 3, and 7 conflict with each other. As illustrated in FIGS. 2 and 3, the objects of control according to the control content "output warning message A from the speakers inside the vehicle" of control pattern 3, and the control content "output warning message B from the speakers inside the vehicle" of the control pattern 7 are the speakers, although the respective warning messages differ with each other. Therefore, the controller 26 determines that control patterns 3 and 7 conflict with each other. Since control pattern 3, which is a first control pattern, is not a priority control pattern, the controller 26 executes control to output warning message B according to control pattern 7, which is a second control pattern, and does not execute control to output warning message A according to control pattern 3. This allows the control pattern set by the user of the vehicle 10 to be preferentially executed, and thus realize control of the vehicle 10 according to the particular use of the vehicle 10 by the user.

In step S106, the controller 26 determines whether to continue the present process. If the present process is to be continued (step S106—Yes), the controller 26 may execute the process of step S103 to repeatedly determine the state of the vehicle 10 at a predetermined timing. In the present embodiment, the predetermined timing may be, for example, a timing that is periodically repeated with a predetermined time interval. Alternatively, the predetermined timing may be a timing that is not periodically repeated and is instead non-periodically repeated. This allows the controller 26 to automatically select the control patterns used to control the vehicle 10 according to the change of the state of the vehicle 10, even if the state of the vehicle 10 changes as the vehicle 10 runs, for example.

SPECIFIC EXAMPLE 1

Referring to FIGS. 2, 3, and 4, the operation of the vehicle 10 will be described below with reference to specific examples. For example, the user of the vehicle 10 is assumed to provide seafood dishes to the passenger inside the vehicle 10. In order to add a sense of realism for the passenger, the user of the vehicle 10 causes the second storage area 21B to store control pattern 5 in FIG. 3 "if a sea is viewable from a window, run the vehicle at 30 km/h or less" and control pattern 6 in FIG. 3 "if a sea is viewable from a window, open the window of the vehicle".

The controller 26 selects control patterns 1, 5, and 6, which include control pattern 5 set by the user, if a sea is viewable during running on an ordinary road, as at time C. The controller 26 executes all of the control patterns since there are no conflicting control patterns included in selected control patterns 1, 5, and 6. Specifically, the controller 26 opens the window of the vehicle 10 and runs the vehicle 10 at 30 km/h or less. This allows the passenger of the vehicle 10 to eat seafood dishes while looking at the sea from the window.

On the other hand, if the sea is viewable during running on a highway, as at time B, the controller 26 selects control patterns 2, 5, and 6, which include control pattern 5 set by the user. However, the controller 26 determines that selected control patterns 2 and 5 conflict with each other. In such a case, the controller 26 prioritizes control pattern 2, which is a priority control pattern, and does not execute control pattern 5. Specifically, the controller 26 opens the window of the vehicle 10 and runs the vehicle 10 at 50 km/h or more, which is the legal minimum speed of the highway. In this manner, if the control pattern set by the user violates a traffic rule under certain conditions such as during running on a highway, the vehicle 10 does not execute the control of the vehicle 10 set by the user so as to safely run in accordance with the traffic rule.

SPECIFIC EXAMPLE 2

As another specific example, the user of the vehicle 10 is assumed to provide a movie screening service inside the vehicle 10. The user of the vehicle 10 causes the second storage area 21B to store control pattern 7 in FIG. 3 "if a passenger not wearing a seat belt during running is present, output warning message B from speakers inside the vehicle" and control pattern 8 "if an image is displayed on a display in the vehicle, turn off the interior lights".

The controller 26 selects control patterns 1, 3, and 7, which include control pattern 7 set by the user, if a passenger not wearing a seat belt is present, as at time D. However, the controller 26 determines that selected control patterns 3 and 7 conflict with each other. In such a case, since control pattern 3 is not a priority control pattern, the controller 26 prioritizes control pattern 7, which is a second control pattern, and does not execute control pattern 3. Specifically, the controller 26 outputs warning message B, and not warning message A, from the speakers inside the vehicle 10. This allows warning message B suitable for movie screening "Fasten your seat belt during screening of the movie" to be output inside the vehicle 10, instead of general-purpose warning message A "Fasten your seat belt during running", so that the interest of the passenger in the vehicle 10 is not decreased, for example. In this manner, the vehicle 10 can preferentially execute the control pattern set by the user to the extent that the control pattern set by the user does not reduce the driving safety of the vehicle 10.

Further, the controller 26 selects control patterns 1 and 8, which include control pattern 8 set by the user, if there is an image being displayed on the display, as at time A. Since selected control patterns 1 and 8 do not conflict with each other, the controller 26 executes both. Specifically, the controller 26 causes the vehicle 10 to run at 60 km/h or less while keeping from turning on the interior lights. This allows the passenger of the vehicle 10 to watch the movie in darkness.

Thereafter, if the controller 26 determines that there is an image being displayed on the display, as at time E, and it becomes dark outside the vehicle 10 such that the illuminance level outside the vehicle 10 is the lights-on illuminance level, the controller 26 selects control patterns 1, 4, and 8, which include control pattern 8 set by the user. The controller 26 determines that the control content "turn on the interior lights" of newly selected control pattern 4 conflicts with "turn off the interior lights" of control pattern 8. In such a case, since control pattern 4 is not a priority control pattern, the controller 26 prioritizes control pattern 8 and does not execute control pattern 4. This ensures that the controller 26 does not turn on the interior lights of the vehicle 10 during screening of the movie, so as to prevent the interest of the passenger of the vehicle 10 from decreasing.

As described above, the control apparatus 20 according to the present embodiment is a control apparatus 20 for a vehicle 10. The control apparatus 20 includes a memory 21 and a controller 26. The memory 21 has a first storage area 21A, which is a write restricted area storing one or more first control patterns out of a plurality of control patterns for the vehicle 10, and a second storage area 21B, which is a write enabled area storing one or more second control patterns out of the plurality of control patterns for the vehicle 10. The controller 26 determines whether a control conditions for each of the plurality of control patterns is satisfied based on a state of the vehicle 10, selects one or more control patterns for each of which the control condition is satisfied, and controls the vehicle 10 according to the selected one or more control patterns. According to this configuration, the control apparatus 20 for the vehicle 10 can reduce the risk of the first control patterns stored in the first storage area 21A being rewritten, while allowing registration, modification, deletion, and the like of control patterns for the vehicle 10. Thus, the convenience of technologies for controlling the vehicle 10 is improved.

In the control apparatus 20 for the vehicle 10 according to the present embodiment, the controller 26 can cause the second storage area 21B to store a new control pattern as a second control pattern in the one or more second control patterns when the controller 26 accepts a registration request of the new control pattern. According to this configuration, the control apparatus 20 for the vehicle 10 enables the user of the vehicle 10 to register the second control pattern in the second storage area 21B according to the use of the vehicle 10. Thus, the convenience of technologies for controlling the vehicle 10 is further improved.

In the control apparatus 20 for the vehicle 10 according to the present embodiment, at least one of the one or more first control patterns may be a priority control pattern. The controller 26 can prioritize control according to the priority control pattern when two or more control patterns are selected and the selected two or more control patterns include the priority control pattern and a control pattern in the one or more second control patterns which conflicts with the priority control pattern. According to this configuration, if a first control pattern, which is a priority control pattern, and a second control pattern conflict with each other, the control apparatus 20 for the vehicle 10 preferentially executes the priority control pattern regardless of the content of the second control pattern. Therefore, the user of the vehicle 10 may register a control pattern corresponding to the use of the vehicle 10 without understanding all of the already-registered priority control patterns, and without considering whether the control pattern to be registered conflicts with any of the priority control patterns.

In the control apparatus 20 for the vehicle 10 according to the present embodiment, the priority control pattern may be a control pattern for running the vehicle 10 according to a traffic rule. According to this configuration, even if a control pattern registered by the user of the vehicle 10 violates the traffic rule, that control pattern is not applied, since running the vehicle 10 according to the traffic rule is executed preferentially as the priority control pattern.

In the control apparatus 20 for the vehicle 10 according to the present embodiment, the controller 26 can prioritize control according to a second control pattern in the one or more second control patterns which conflicts with a non-priority control pattern which is a first control pattern in the one or more first control patterns other than the priority control pattern when the selected two or more control patterns include the non-priority control pattern and the second control pattern which conflicts with the non-priority control pattern. According to this configuration, by virtue of the user of the vehicle 10 setting the second control pattern, the second control pattern is preferentially executed to the extent that the second control pattern does not conflict with a priority control pattern. Accordingly, control of the vehicle 10 in accordance with the particular use of the vehicle 10 by the user is further realized.

The vehicle 10 according to the present embodiment includes the control apparatus 20 described above. According to this configuration, the vehicle 10 can reduce the risk of the first control patterns stored in the first storage area 21A being rewritten, while allowing registration, modification, deletion, and the like of control patterns used to control the vehicle 10, for the user of the vehicle 10. Thus, the convenience of technologies for controlling the vehicle 10 is improved.

The control method according to the present embodiment is a control method of a vehicle 10 including a controller 26 and a memory 21 having a first storage area 21A, which is a write restricted area storing one or more first control patterns out of a plurality of control patterns for the vehicle 10, and a second storage area 21B, which is a write enabled area storing one or more second control patterns out of the plurality of control patterns for the vehicle 10. The control method includes determining, by the controller 26, whether a control condition for each of the plurality of control patterns is satisfied based on a state of the vehicle 10, and selecting one or more control patterns for each of which the control condition is satisfied, and controlling, by the controller 26, the vehicle 10 according to the selected one or more control patterns. According to this configuration, the vehicle 10 can reduce the risk of the first control patterns stored in the first storage area 21A being rewritten, while allowing registration, modification, deletion, and the like of control patterns used to control the vehicle 10, for the user of the vehicle 10. Thus, the convenience of technologies for controlling the vehicle 10 is improved.

While the present disclosure has been described based on the drawings and examples, it should be noted that various changes and modifications may be implemented by those skilled in the art based on the present disclosure. Accordingly, such changes and modifications are included within the scope of the present disclosure. For example, functions or the like included in each means, each step, or the like can be rearranged without logical inconsistency, and a plurality of means, steps, or the like can be combined together or divided.

For example, in the embodiment described above, all or some of the functions or processes described as the functions or processes of the control apparatus 20 may be implemented as functions or processes of a general-purpose information processing apparatus such as a smartphone or a computer, for example. Specifically, a program in which instructions for realizing each function of the control apparatus 20 according to the embodiment are written may be stored in the memory of the information processing apparatus, so that the program is read and executed by the processor of the information processing apparatus. Accordingly, the invention according to the present embodiment can also be implemented as a program executable by a processor. For example, when a general-purpose information processing apparatus is caused to function as the control apparatus 20 for the vehicle 10, the information processing apparatus may be implemented by installing, in the vehicle 10, the information processing apparatus having the configuration and functions described above as the configuration and functions of the control apparatus 20 for the vehicle 10.

Alternatively, whereas the control apparatus 20 was described as an apparatus which includes the communication interface 22 and the input interface 23, separate from the acquisition interface 25, in the embodiment described above, the controller 26 of the control apparatus 20 may use the communication interface 22 and the input interface 23 as the acquisition interface 25 for acquiring information indicating the state of the vehicle 10. For example, the controller 26 may acquire information indicating the state of the vehicle 10 from the information processing apparatus outside the vehicle 10 via the communication interface 22. Alternatively, the controller 26 may acquire information indicating the state of the vehicle 10 from an input operation by a passenger of the vehicle 10 or the like via the input interface 23. In such cases, the communication interface 22 and the input interface 23 are included in the acquisition interface 25.

The invention claimed is:

1. A control apparatus for a vehicle, comprising:
   a memory having a first storage area, which is a write restricted area configured to store one or more first control patterns out of a plurality of control patterns for the vehicle, and a second storage area, which is a write enabled area configured to store one or more second control patterns out of the plurality of control patterns for the vehicle; and
   a controller configured to determine whether a control condition for each of the plurality of control patterns is satisfied based on a state of the vehicle, to select one or more control patterns for each of which the control condition is satisfied, and to control the vehicle according to the selected one or more control patterns,
   wherein at least one of the one or more first control patterns is a priority control pattern, and
   the controller is configured to prioritize control according to the priority control pattern when two or more control patterns are selected and the selected two or more control patterns include the priority control pattern and a second control pattern in the one or more second control patterns which conflicts with the priority control pattern.

2. The control apparatus according to claim 1, wherein the controller is configured to cause the second storage area to store a new control pattern as a second control pattern in the one or more second control patterns when the controller accepts a registration request of the new control pattern.

3. The control apparatus according to claim 1, wherein the priority control pattern is a control pattern for running the vehicle according to a traffic rule.

4. The control apparatus according to claim 1, wherein the controller is configured to prioritize control according to a second control pattern in the one or more second control patterns which conflicts with a non-priority control pattern which is a first control pattern in the one or more first control patterns other than the priority control pattern when the selected two or more control patterns include the non-priority control pattern and the second control pattern which conflicts with the non-priority control pattern.

5. The control apparatus according to claim 1, wherein the controller is configured to determine whether the control condition for each of the plurality of control patterns is satisfied, based on any of a running state, an in-vehicle state, and an out-of-vehicle state of the vehicle as the state of the vehicle.

6. The control apparatus according to claim 5, wherein the controller is configured to determine whether the control condition for each of the plurality of control patterns is satisfied, based on either a speed of the vehicle or a classification of a roadway on which the vehicle is running, as the running state of the vehicle.

7. The control apparatus according to claim 5, wherein the controller is configured to determine whether the control condition for each of the plurality of control patterns is satisfied, based on either whether a passenger not wearing a seat belt is present, or whether an image is displayed on a display, as the in-vehicle state of the vehicle.

8. The control apparatus according to claim 5, wherein the controller is configured to determine whether the control condition for each of the plurality of control patterns is satisfied, based on either whether a sea is viewable from a window of the vehicle, or an illuminance level outside the vehicle, as the out-of-vehicle state of the vehicle.

9. A vehicle comprising the control apparatus according to claim 1.

10. A control method for a vehicle, the vehicle including a controller and a memory having a first storage area, which is a write restricted area storing one or more first control patterns out of a plurality of control patterns for the vehicle, and a second storage area, which is a write enabled area storing one or more second control patterns out of the plurality of control patterns for the vehicle, the control method comprising:
   determining, by the controller, whether a control condition for each of the plurality of control patterns is satisfied based on a state of the vehicle, to select one or more control patterns for each of which the control condition is satisfied; and
   controlling, by the controller, the vehicle according to the selected one or more control patterns,
   wherein at least one of the one or more first control patterns is a priority control pattern, and
   the controller prioritizes control according to the priority control pattern when two or more control patterns are selected and the selected two or more control patterns include the priority control pattern and a second control pattern in the one or more second control patterns which conflicts with the priority control pattern.

11. The control method according to claim 10, wherein the controller causes the second storage area to store a new control pattern as a second control pattern in the one or more second control patterns when the controller accepts a registration request of the new control pattern.

12. The control method according to claim 10, wherein the priority control pattern is a control pattern for running the vehicle according to a traffic rule.

13. The control method according to claim 10, wherein the controller prioritizes control according to a second control pattern in the one or more second control patterns which conflicts with a non-priority control pattern which is a first control pattern in the one or more first control patterns other than the priority control pattern when the selected two or more control patterns include the non-priority control pattern and the second control pattern which conflicts with the non-priority control pattern.

14. A non-transitory computer readable medium storing a control program which causes a computer including a memory having a first storage area, which is a write restricted area storing one or more first control patterns out of a plurality of control patterns for a vehicle, and a second storage area, which is a write enabled area storing one or more second control patterns out of the plurality of control patterns for the vehicle, to execute:

determining whether a control condition for each of the plurality of control patterns is satisfied based on a state of the vehicle, to select one or more control patterns for each of which the control condition is satisfied; and controlling the vehicle according to the selected one or more control patterns, wherein at least one of the one or more first control patterns is a priority control pattern, and the computer prioritizes control according to the priority control pattern when two or more control patterns are selected and the selected two or more control patterns include the priority control pattern and a second control pattern in the one or more second control patterns which conflicts with the priority control pattern.

15. The non-transitory computer readable medium according to claim 14, wherein the computer causes the second storage area to store a new control pattern as a second control pattern in the one or more second control patterns when the computer accepts a registration request of the new control pattern.

16. The non-transitory computer readable medium according to claim 14, wherein the priority control pattern is a control pattern for running the vehicle according to a traffic rule.

17. The non-transitory computer readable medium according to claim 14, wherein the computer prioritizes control according to a second control pattern in the one or more second control patterns which conflicts with a non-priority control pattern which is a first control pattern in the one or more first control patterns other than the priority control pattern when the selected two or more control patterns include the non-priority control pattern and the second control pattern which conflicts with the non-priority control pattern.

* * * * *